US012686651B1

(12) United States Patent　　(10) Patent No.:　US 12,686,651 B1

Harries et al.　　(45) Date of Patent:　　Jul. 21, 2026

(54) NATURAL ORGANIC REDUCTION SYSTEM

(71) Applicant: Earth Funeral Group, Inc., Auburn, WA (US)

(72) Inventors: Thomas Henry Harries, San Francisco, CA (US); Justin Matthews Knowles, Hayden, ID (US); Marko Oviir, Shoreline, WA (US); Matthew Lane Moloney, Seattle, WA (US); Scott James Healy, Seattle, WA (US); Christopher Paul Harry, Issaquah, WA (US); Geoffrey Becker Hill, Shoreline, WA (US); Barrett Estep Krueger, Seattle, WA (US)

(73) Assignee: Earth Funeral Group, Inc., Auburn, WA (US)

( * ) Notice: Subject to any disclaimer, the term of this patent is extended or adjusted under 35 U.S.C. 154(b) by 0 days.

(21) Appl. No.: 19/067,699

(22) Filed: Feb. 28, 2025

Related U.S. Application Data

(60) Provisional application No. 63/560,443, filed on Mar. 1, 2024.

(51) Int. Cl.

| | |
|---|---|
| *C05F 17/929* | (2020.01) |
| *C05F 1/02* | (2006.01) |
| *C05F 17/964* | (2020.01) |
| *C05F 17/993* | (2020.01) |

(52) U.S. Cl.
CPC .............. *C05F 17/929* (2020.01); *C05F 1/02* (2013.01); *C05F 17/964* (2020.01); *C05F 17/993* (2020.01)

(58) Field of Classification Search
None
See application file for complete search history.

(56) References Cited

U.S. PATENT DOCUMENTS

| | | | |
|---|---|---|---|
| 4,700,884 A | * 10/1987 | Barrett | G05D 23/1393 |
| | | | 126/362.1 |
| 9,492,697 B2 | 11/2016 | Wilson | |
| 10,835,773 B2 | 11/2020 | Mason | |
| 11,439,559 B2 | 9/2022 | Jenkins | |
| 2010/0213292 A1 | 8/2010 | Sullivan | |
| 2020/0207675 A1 | 7/2020 | Bernstein et al. | |
| 2023/0249233 A1 | 8/2023 | Twining et al. | |
| 2025/0002424 A1 | 1/2025 | Aurel | |

FOREIGN PATENT DOCUMENTS

| | | | | |
|---|---|---|---|---|
| DE | 3626903 A1 | * 2/1988 | ............ | C05F 17/929 |
| DE | 3819979 A1 | * 8/1989 | ................ | C05F 3/00 |
| EP | 0253702 A2 | * 1/1988 | ............ | C12M 23/06 |
| EP | 4282549 A1 | 11/2023 | | |
| WO | WO-2007019513 A2 | * 2/2007 | ............ | C05F 17/921 |
| WO | WO-2019023343 A1 | * 1/2019 | ............... | F23G 1/00 |

* cited by examiner

*Primary Examiner* — Michael A Marcheschi
*Assistant Examiner* — Jonathan E Lepage
(74) *Attorney, Agent, or Firm* — AMPACC Law Group, PLLC

(57)　　　　ABSTRACT

Various systems and methods associated with human composting, such as Natural Organic Reduction (NOR), are described herein. The systems and methods may provide an array of composters, or NOR vessels, that perform composting operations, where the operations are controlled by a composting system that monitors conditions and/or performance to enhance or optimize the composting/NOR operations.

14 Claims, 20 Drawing Sheets

1210

1200

1220

1325

1330

1350

1340

1220

1500

1510
RECEIVE INDICATION OF A FUTURE COMPOSTING PROCESS

1520
MEASURE WEIGHT DISTRIBUTION OF PILE OF COMPOST WITHIN VESSEL

1530
ROTATE VESSEL TO MOVE PILE OF COMPOST TO A DIFFERENT AREA

NATURAL ORGANIC REDUCTION SYSTEM

CROSS-REFERENCE TO RELATED APPLICATIONS

This application claims priority to U.S. Provisional Patent Application No. 63/560,443, filed on Mar. 1, 2024, entitled COMPOSTING SYSTEM, and is related to U.S. patent application Ser. No. 19/067,721, filed on Feb. 28, 2025, entitled PERFORMING NATURAL ORGANIC REDUC-TION USING A CYLINDRICAL VESSEL, which are hereby incorporated by reference in their entirety.

BACKGROUND

Composting involves recycling organic material (e.g., yard debris, food waste) into fertilizers or other nutrient-rich soils, which can be used when growing new plants, trees, and so on. One form of composting is human composting, such as terramation or Natural Organic Reduction (NOR). For example, NOR involves a contained, accelerated con-version of a human body into soil. Often, NOR is performed in a NOR vessel, which is an enclosed container (e.g., a composter) in which a natural organic reduction occurs or takes place.

Conventional composting systems are not well suited for human composting. While generally useful for certain pro-cesses (e.g., supplying air and moisture), such systems have drawbacks associated with the speed of their processes (e.g., the processes are too slow to break down a body into soil), the specificity of their equipment (e.g., the equipment cannot perform separate processes for each body), and so on. These and other drawbacks exist with respect to conventional composting systems.

BRIEF DESCRIPTION OF THE DRAWINGS

Embodiments of the present technology will be described and explained through the use of the accompanying draw-ings.

Figure 1:
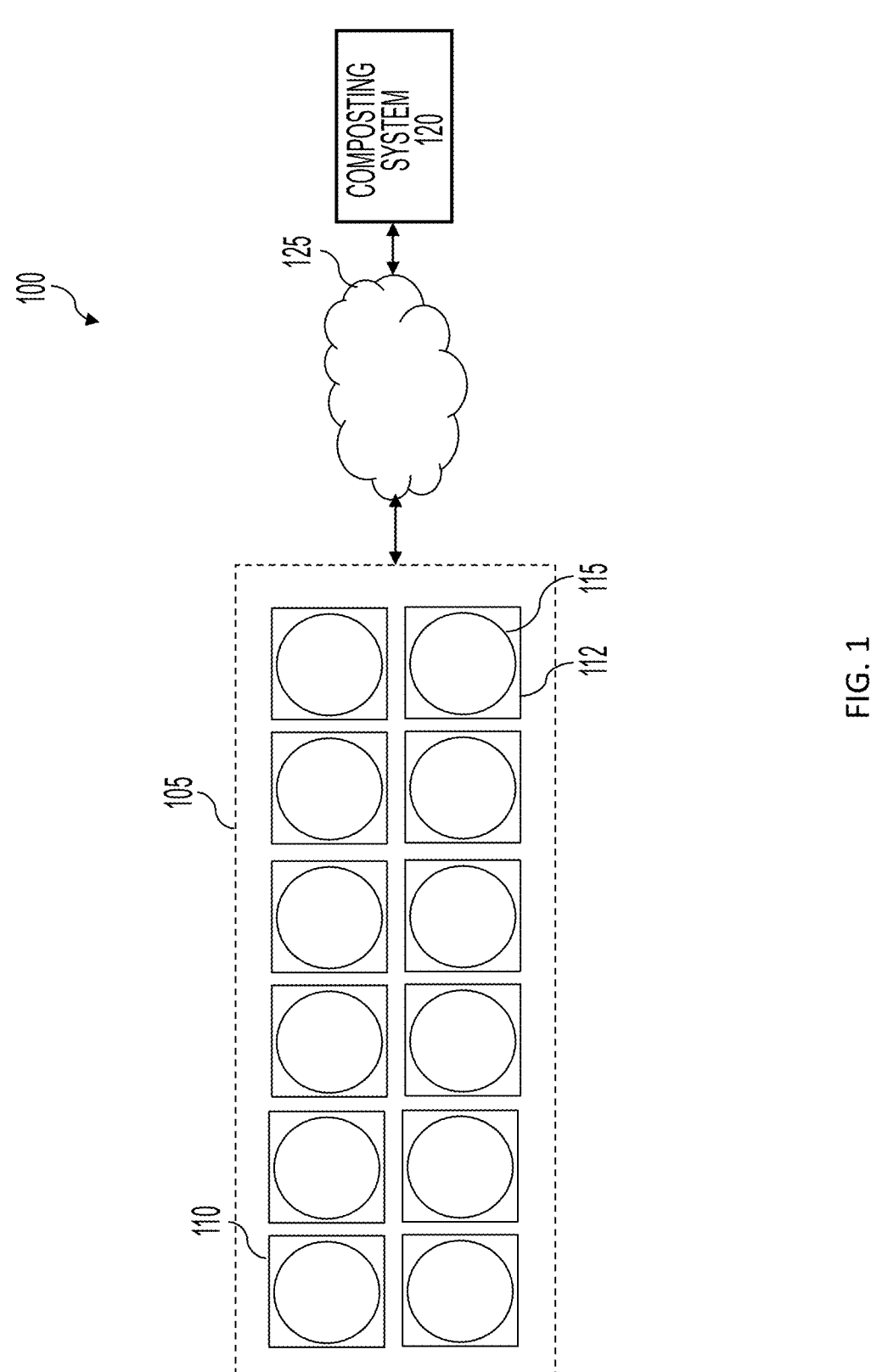
FIG. 1 is a diagram illustrating a suitable environment for performing human composting processes using an array of composters.

In the drawings, some components are not drawn to scale, and some components and/or operations can be separated into different blocks or combined into a single block for discussion of some of the implementations of the present technology. Moreover, while the technology is amenable to various modifications and alternative forms, specific imple-mentations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Various systems and methods associated with human composting, such as Natural Organic Reduction (NOR), are described herein. The systems and methods may provide an array of composters, or NOR vessels, that perform compost-ing operations, where the operations are controlled by a composting system that monitors conditions and/or perfor-mance to enhance or optimize the composting/NOR opera-tions.

In some embodiments, a NOR vessel or composter may comprise a frame having multiple trunnions, upon which a front end of a cylindrical vessel is supported, and a rear axle that connects (and supports) a rear end of the cylindrical vessel to the frame.

In some embodiments, a composting system is coupled or connected to the composter array and/or each of the com-posters. The composting system may include various sub-systems, such as systems associated with monitoring the performance of composting processes within the compos-ters, controlling operation (e.g., rotation) of the composters, measuring data or information associated with running pro-cesses, generating reports associated with running or fin-ished processes, and so on.

Various embodiments of the technology will now be described. The following description provides specific details for a thorough understanding and an enabling description of these embodiments. One skilled in the art will understand, however, that these embodiments may be prac-ticed without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Composter Array and Associated Composting System

As described herein, the technology is directed to NOR, where a body is converted or transformed into compost or nutrient-rich soil. FIG. 1 is a diagram illustrating a suitable network environment 100 for performing NOR processes using an array of composters.

Multiple composters 110, or NOR vessels, form a com-poster array 105, or array of the composters 110. Each composter 110 includes a frame 112 and a vessel 115 supported and/or controlled by the frame 112. During use or operation, a composter 110 receives a single body, and thus is sized to include the body and additional material or additions utilized during a composting process. For example, the composters 110 may be cylindrical and have an internal volume that accommodates the generation of 1 cubic yard of compost (e.g., having approximate dimensions of 8 feet by 4 feet by 4 feet). Of course, the composters 110 can have different volumes or dimensions. Further, the composter array 105 can include multiple composters 110, such as two composters 110, twelve composters 110, twenty composters 110, or any number of composters 110.

To begin a NOR process, a vessel 115 may initially receive a body (e.g., a body that is washed and wrapped in a biodegradable shroud). The vessel 115 may include layers of organic material (e.g., mulch and/or woodchips) upon which the body is placed within the vessel 115. Additional organic material (e.g., wildflowers or other material) may be added as an amendment to the contents of the vessel 115. During a composting operation (e.g., an operation having a duration of 45 days or fewer) that is controlled as described herein, microbes break down the contents (e.g., the body and other organic material) into nutrient-rich soil.

A composting system 120 is coupled or connected to the composter array 105 and/or each of the composters 110 via a network 125 (or via direct connections). The composting system 120 includes various sub-systems, such as systems associated with monitoring the performance of composting processes within the composters 110, controlling operation of the composters 110, measuring data or information associated with running processes, generating reports associated with running or finished processes, and so on.

The sub-systems, components, and/or modules of the composting system 120 can be implemented with a combination of software (e.g., executable instructions, or computer code) and hardware (e.g., at least a memory and processor). Accordingly, as used herein, in some example embodiments, a component/module is a processor-implemented component/module and represents a computing device having a processor that is at least temporarily configured and/or programmed by executable instructions stored in memory to perform one or more of the functions that are described herein.

In some embodiments, the composting system 120 includes a backwash system 210. The backwash system 210 controls and monitors backwash or cleaning processes that wash the vessel 115 of the composter 110. For example, a backwash process, as controlled by the backwash system 210, can include a specific sequence of water and air insertions to clean out material from various ports of the vessel 115 during or after a composting operation within the vessel 115. Further details regarding the operation of the backwash system 210 and associated backwash and cleaning processes are described herein.

In some embodiments, the composting system 120 includes a vessel control system 220. The vessel control system 220 controls operation of the vessel 115, such as the movement or rotation of the vessel 115 within the frame 110 during a composting operation or backwash process. The vessel control system 220 may also control other operations associated with the vessel 115, such as the operation of one or more ports, valves, or controls. Further details regarding the operation of the vessel control system 220 and associated control of the vessel 115 are described herein.

In some embodiments, the composting system 120 includes an aeration system 230. The aeration system 230 monitors and controls an aeration process of the contents of the vessel 115, such as a continuous aeration within an enclosed space (e.g., the inside of the vessel 115). For example, the aeration system 115 can monitor various components (e.g., a valve system) of the vessel 115 during aeration to cause air to be forced through the contents at specific air flow rates, durations, precisions, locations, and so on. Further details regarding the operation of the aeration system 230 and aeration during the composting operation within an enclosed space (e.g., the vessel 115) are described herein.

In some embodiments, the composting system 120 includes an air flow system 240. The air flow system 240 monitors and controls the flow of air into the vessel 115, such as via a series of valves of the vessel 115. For example, the air flow system 240 can monitor conditions (e.g., temperature, moisture levels, levels of various particles (e.g., $CO_2$) in the air) within the vessel 115 and modify or adjust the flow of air into the vessel 115 during the composting operation. Further details regarding the operation of the air flow system 240 and associated air flow control are described herein.

Of course, the composting system 120 can include other systems, sub-systems, modules, or aspects associated with the composter array 105 and/or the composters 110.

Figure 2:
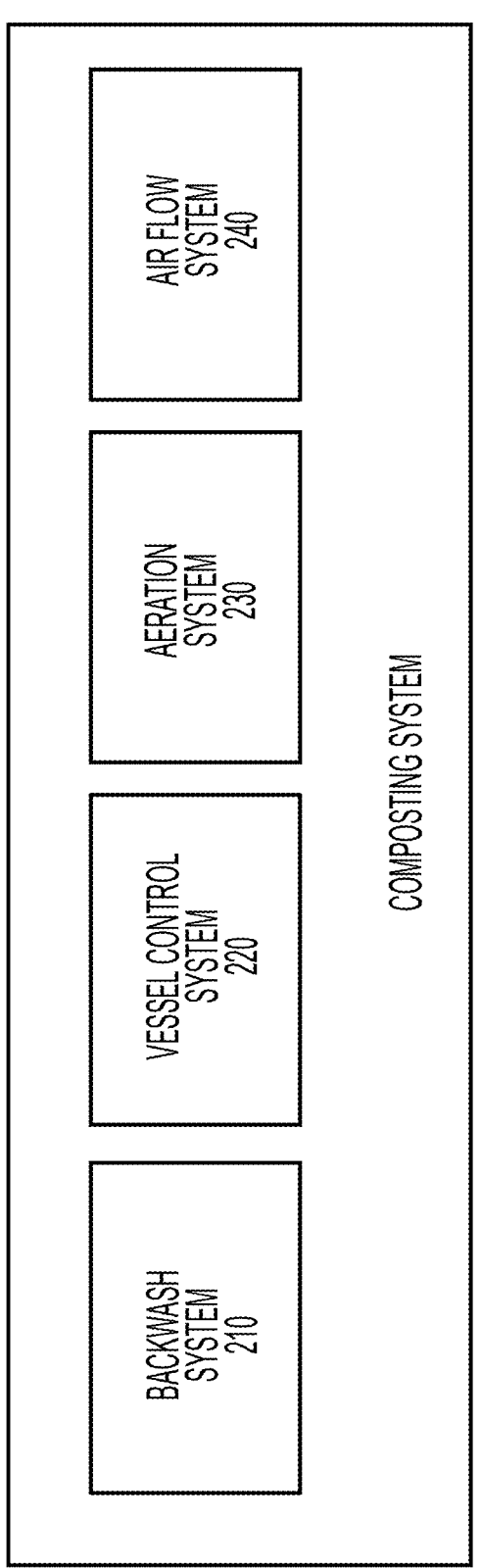
FIG. 2 is a block diagram illustrating modules of a composting system.
Figure 3A:
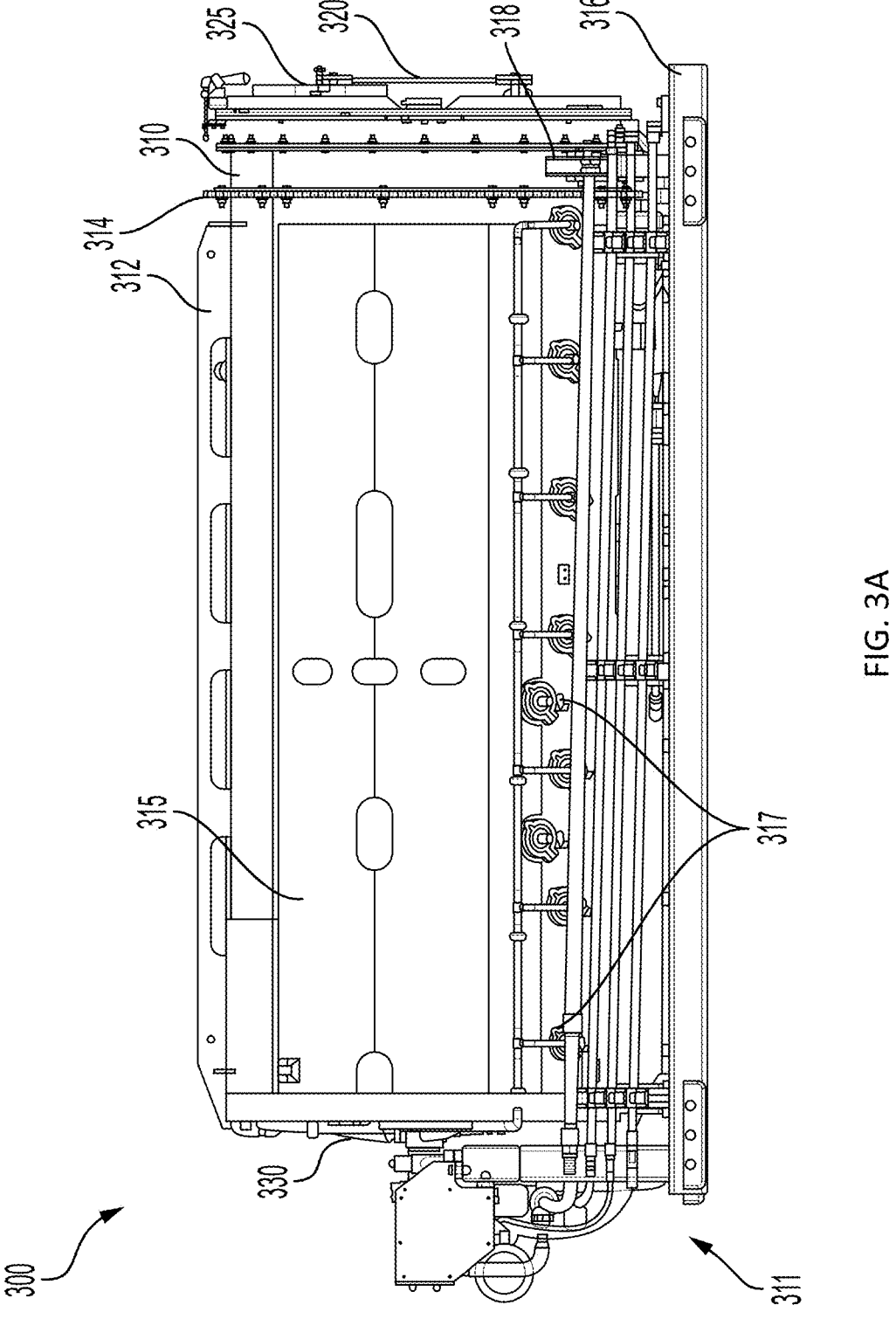
FIGS. 3A-3D are diagrams illustrating an example com-poster.
Figure 3B:
Figure 3C:
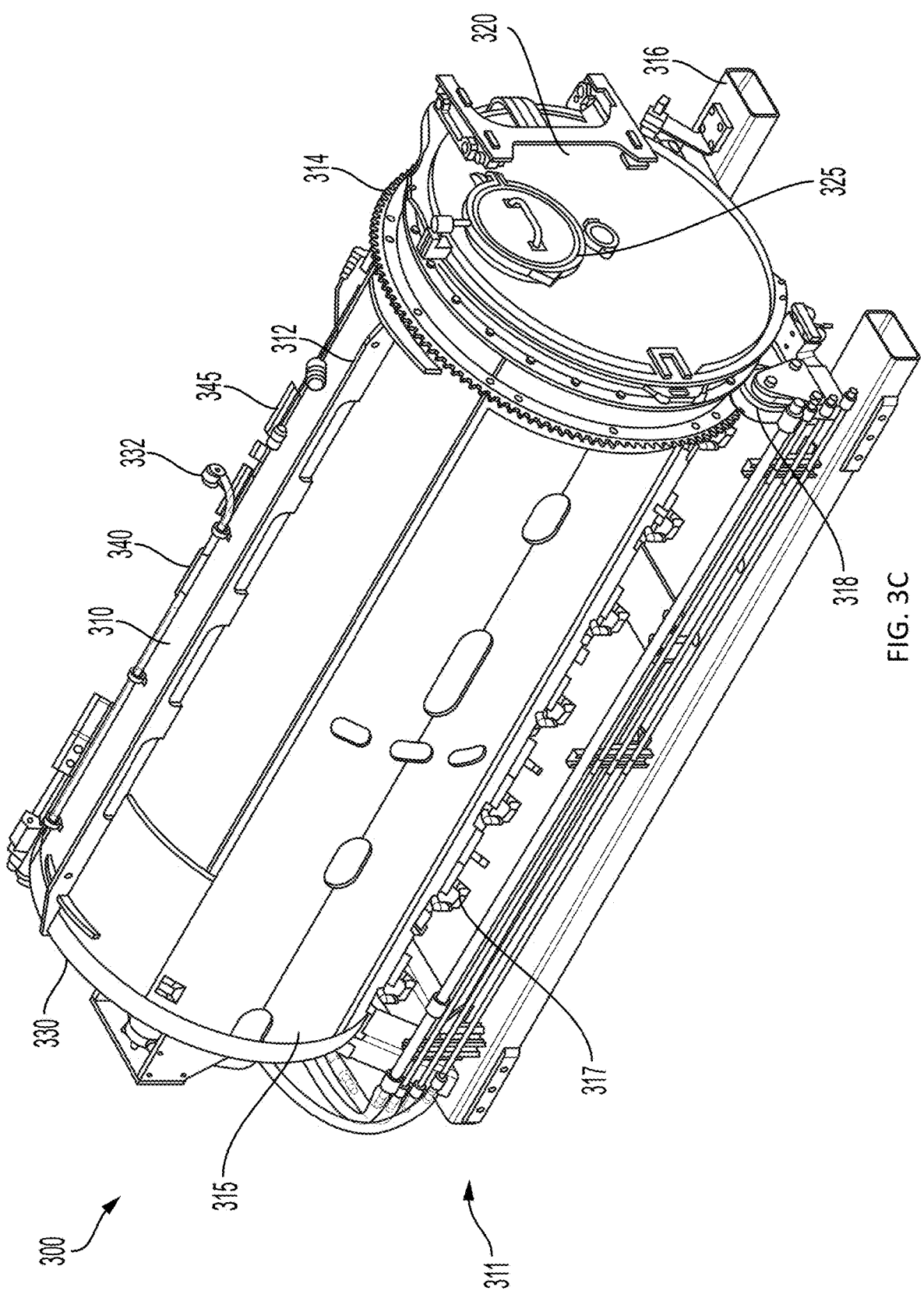
Figure 3D:
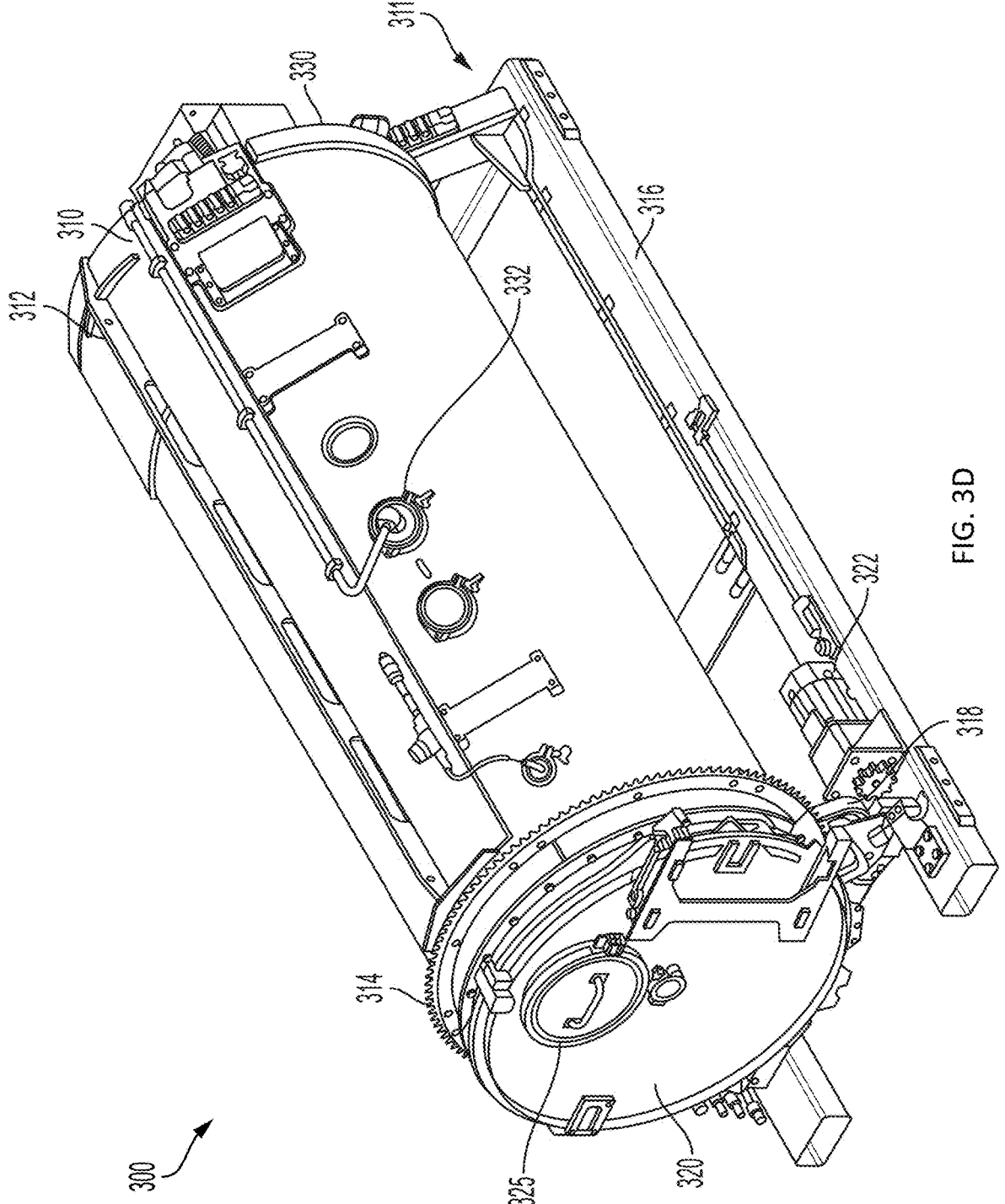

FIGS. 1-2 and the components, systems, servers, and devices depicted herein provide a general computing environment and network within which the technology described herein can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network or cloud 125 can depict any network, ranging from a wired or wireless local area network (LAN), to a wired or wireless wide area network (WAN), to the Internet or some other public or private network, to a cellular (e.g., 4G, LTE, or 5G network), and so on. While the connections between the various devices and the network 125 and are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server or cloud-based computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, ARNR devices, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hardwired or pre-programmed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of a Composter or NOR Vessel

As described herein, in some embodiments, the composter 110 and/or vessel 115 can include various components, objects, devices, or apparatuses that enhance or improve a composting operation, such as an operation that transforms a human body (e.g., a decedent) into compost or nutrient-rich soil.

FIGS. 3A-3D are diagrams that illustrate an example composter 300 for performing human composting and/or NOR. The composter 300, in some embodiments, is an example of the composter 110.

The composter 300 includes a vessel 310, such as a cylindrical structure that includes an inner area within which the various composting processes described herein are performed. The vessel 310 includes a fin 312 or bumper located on a top section of the vessel 310. In some cases, additional bumpers 315 or guide rails may be disposed on an outer surface of the vessel 310.

Thus, the vessel 310 can include components that facilitate movement of the vessel 310 into or out of a rack or other support structure (e.g., composter array 105) within which the vessel 310 is positioned and/or secured during composting processes. The fin 312 and/or bumpers 315 can assist in guidance or reception of the vessel 310 into a rack or support structure as well as protect the vessel 310 and its surface mounted components from damage during movement, among other benefits.

The vessel 310 is supported by a frame 311, which may include fork pockets 316 located at a lower area of the vessel 310 (at or forming a support structure for the frame 311). For example, the fork pockets 316 are positioned to facilitate reception of forks or tines of a forklift that can lift and move the composter 300 (e.g., the vessel 310 supported by the frame 311) to different locations, such as to a location within the composter array 105, to a service or cleaning area of a facility, and so on.

The frame 311 also includes multiple trunnions 318 that facilitate rotation or movement of the vessel 310 during various processes. The trunnions 318, in some cases, are located on one end (e.g., near a front hatch 320 or front area of the frame 311) of the vessel 310, although there can be trunnions located at both ends of the vessel 310 or frame 311 and/or at locations near a center point of the vessel 310 or frame 311. A motor 322 may drive a chain (not shown) that engages teeth of a surface mounted gear 314, located near the trunnions 318, to rotate the vessel 310 on the frame 311.

A rear axle (e.g., part of a rear assembly 335 of the rear end 330) of the frame 311 supports the vessel 310 on the other end (e.g., a rear end 330). Thus, the frame 311 can support the vessel 310 at three contact points, the rear axle and two trunnions 318. The frame 311, therefore, may include the fork pockets 316, the trunnions 318, the rear assembly 335 and/or various support arms configured to maintain the vessel 310 in a rotatable position and/or facilitate re-location of the composter 300.

In some embodiments, the front hatch 320 opens to facilitate the placement of a body and various organic materials, as well as to remove compost or soil once a compositing process is complete. During operation, the front hatch 320 is sealed to ensure a fully enclosed inner area of the vessel 310 during operation.

The front hatch 320 includes an amendment hatch 325, which is a small port or opening that enables insertion or entry of amendments (e.g., additional organic materials or other recipe materials) into the vessel 310 during a composting process (e.g., during a running NOR). Unlike the front hatch 320, which generally does not open during a running process, the amendment hatch 325 may include an airlock mechanism or bulkhead that facilitates the addition of materials into the vessel 310 while preventing fumes or other airborne particles from escaping during the running process.

As described herein, the rear end 330 includes the rear assembly 335, which includes a rotary union and rear axle manifold (e.g., a rear axle). The rear assembly 335 facilitates rotation of the vessel 310 (as driven by the motor 322 and gear 314 on the trunnions 318) via the rotary union, as well as connection or coupling to a main valve assembly 337, which is supported by the frame 311 or a cradle. Further details regarding the rear assembly 335 are described herein.

During composting operations (e.g., aeration, backwashing, and so on), the vessel 310 receives or intakes air or water, and exhausts air or other substances. The vessel 310 may include an exhaust 332 that is located on top of the vessel 310 (e.g., during certain rotational orientations of the vessel 310). Multiple intake valves 317, which enable the intake of air and/or water, are located or disposed at a lower area of the vessel 310, such as along a long axis of the vessel 310. For example, the valves 317 can facilitate a measured flow of air into the vessel 310 during a composting process and facilitate the intake of water and/or air during back-washing of the valves 317 and the vessel 310.

The vessel 310 may also include various measurement or sampling components, such as a pH level sampling component 340 and an oxygen level sampling component 345. These components can continuously monitor different levels within the vessel 310 during a composting process, providing the composting system 120 with information about the composting processing and its performance or characteristics. Further details are described herein.

Figure 4:
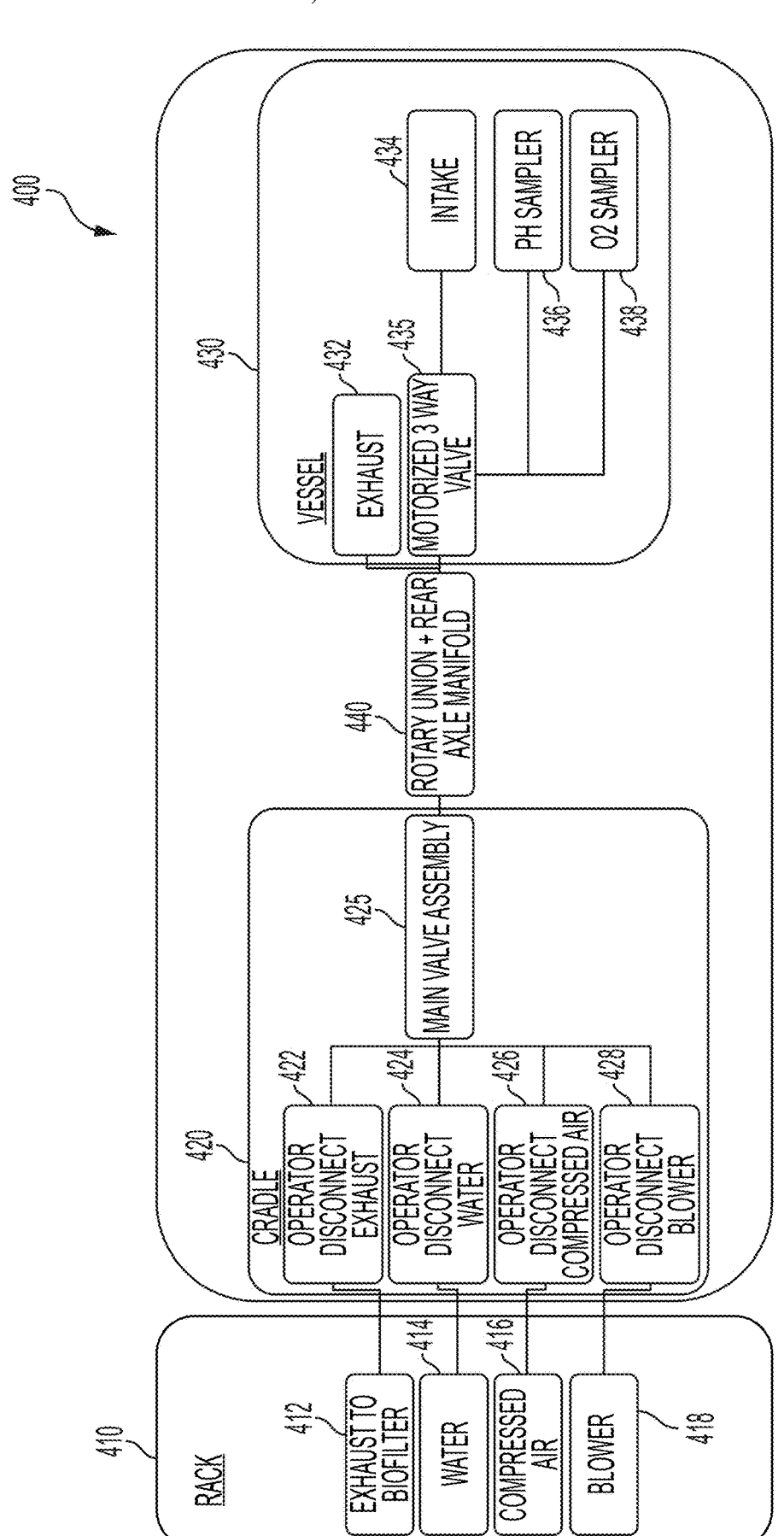
FIG. 4 is a block diagram illustrating components of a plumbing assembly for a composter.

FIG. 4 depicts a plumbing assembly 400 for the composter 300, such as the various components that facilitate the intake or exhaust or water into or out of the vessel 310 and/or the intake or exhaust or air into or out of the vessel 310. The plumbing assembly 400 can include components at or within a rack 410 (e.g., part of an array) within which the composter 300 is disposed during a composting process, components at or within a cradle 420 (or frame 311) of the composter 300, and components on or within a vessel 430 (e.g., the vessel 310) of the composter 300.

The plumbing components of the rack 410 may include components external to the composter 300, such as supply components, filtering components, and other external devices. For example, the rack 410 can include an exhaust component 412, such as a filtering device (e.g., a biofilter) that receives exhaust fumes and filters or otherwise mitigates the fumes. The rack 410 can also include a water supply 414, an air supply (e.g., an air compressor) 416, an air blower 418, and so on. Some or all of these components may be mounted at a location on or within the rack 410 to facilitate connections to related components on the cradle 420 and/or on the vessel 430.

The plumbing components of the cradle 420 may include components external to the vessel 430 and connected or coupled to the vessel 430 via a main valve assembly 425, such as various valves, manifolds, or safety components. For example, the cradle 420 can include components that disconnect the supply components to the main valve assembly 425, including an exhaust disconnect component 422, a water disconnect component 424, a compressed air disconnect component 426, and a blower disconnect component 428.

The main valve assembly 425 includes various valves and lines that facilitate the transfer of water or air to the intake valves 317 of the vessel 430 and to the inner area of the vessel 310 via a rotary union and rear axle manifold 440. Similarly, air and substances exhausted from the vessel 430 are received by the main valve assembly 425 and transferred out of the composter 300, such as via a biofilter of the exhaust component 412.

The rotary union and rear axle manifold 440 couples the main valve assembly 425 (and thus water and air) to the vessel 430, via a motorized three-way valve 435. The valve 435 is coupled to various additional valves on or within the vessel 430, such as intake valves 434 (e.g., the intake valves 317), a pH sampler component 436, and an O2 sampler component 438. Further, an exhaust component 432 is coupled to the rotary union and rear axle manifold 440, which enables exhaust fumes and other substances or gases to exit the vessel 430.

Figure 5:
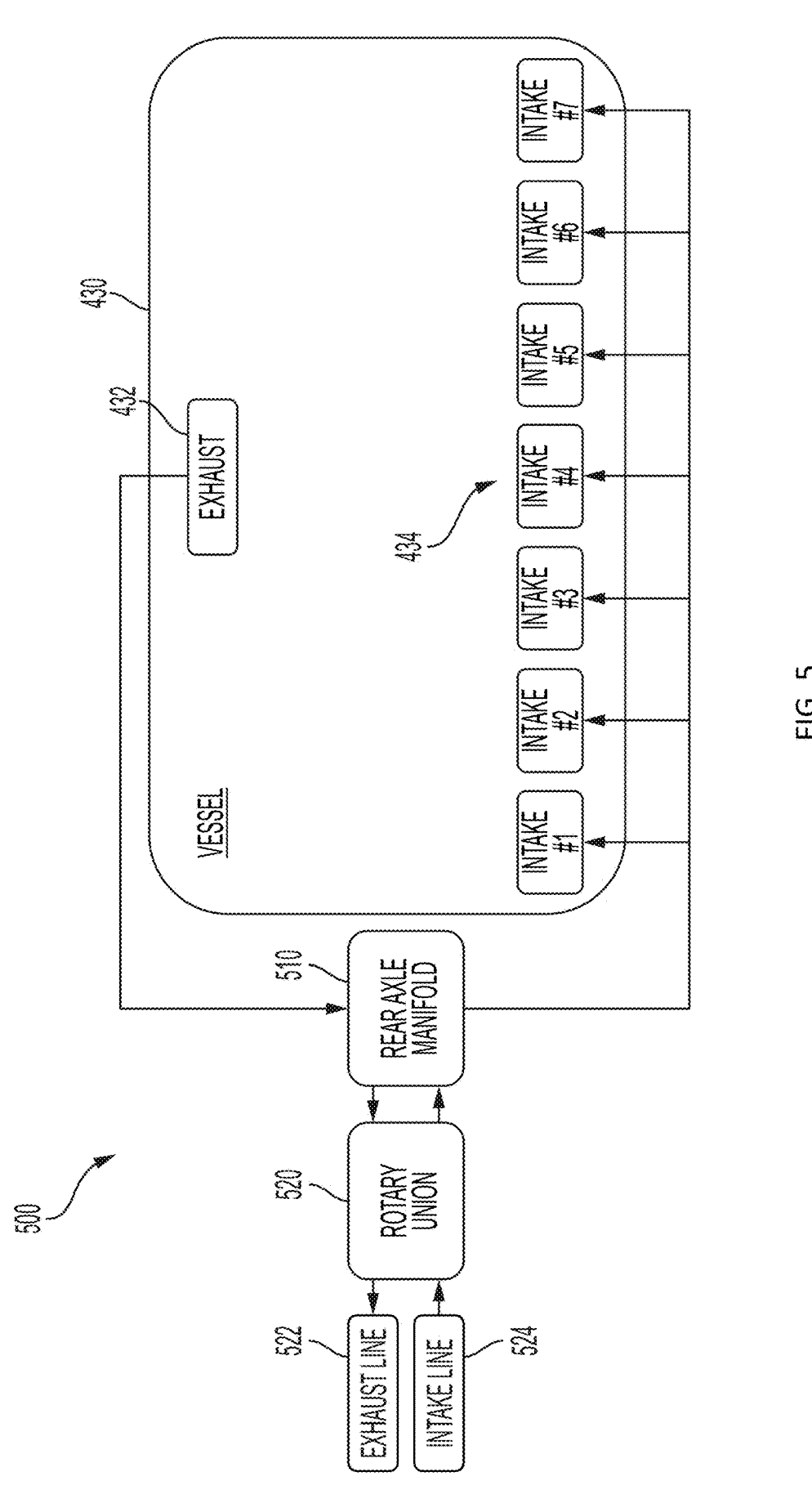
FIGS. 5-6 are diagrams illustrating plumbing components for a composter.

As an example, FIG. 5 depicts flows of 500 air and water into and out of the vessel 430. As shown, an intake line 524 sends air or water into the vessel 430 via a rotary union 520 and a rear axle manifold 510. Intake valves 434 (e.g., valves #1-7) receive air during the composting process, which causes aeration of the contents in the vessel 430. As another example, the intake valves 434 receive compressed air during backwashing, causing the valves and vessel 430 to be cleaned during the process.

Further, fumes or other gases may flow out of the vessel 430, as shown. For example, fumes may exit the vessel 430 via the exhaust 432 and travel through the rear axle manifold 510 and rotary union 520 to an exhaust line 522. Thus, the rotary union 520 and rear axle manifold 510 may function in a two-way or dual mode of operation, moving air/water from the intake line 524 to the intake valves 434 and/or moving fumes/substances from the exhaust 432 to the exhaust line 522.

Figure 6:
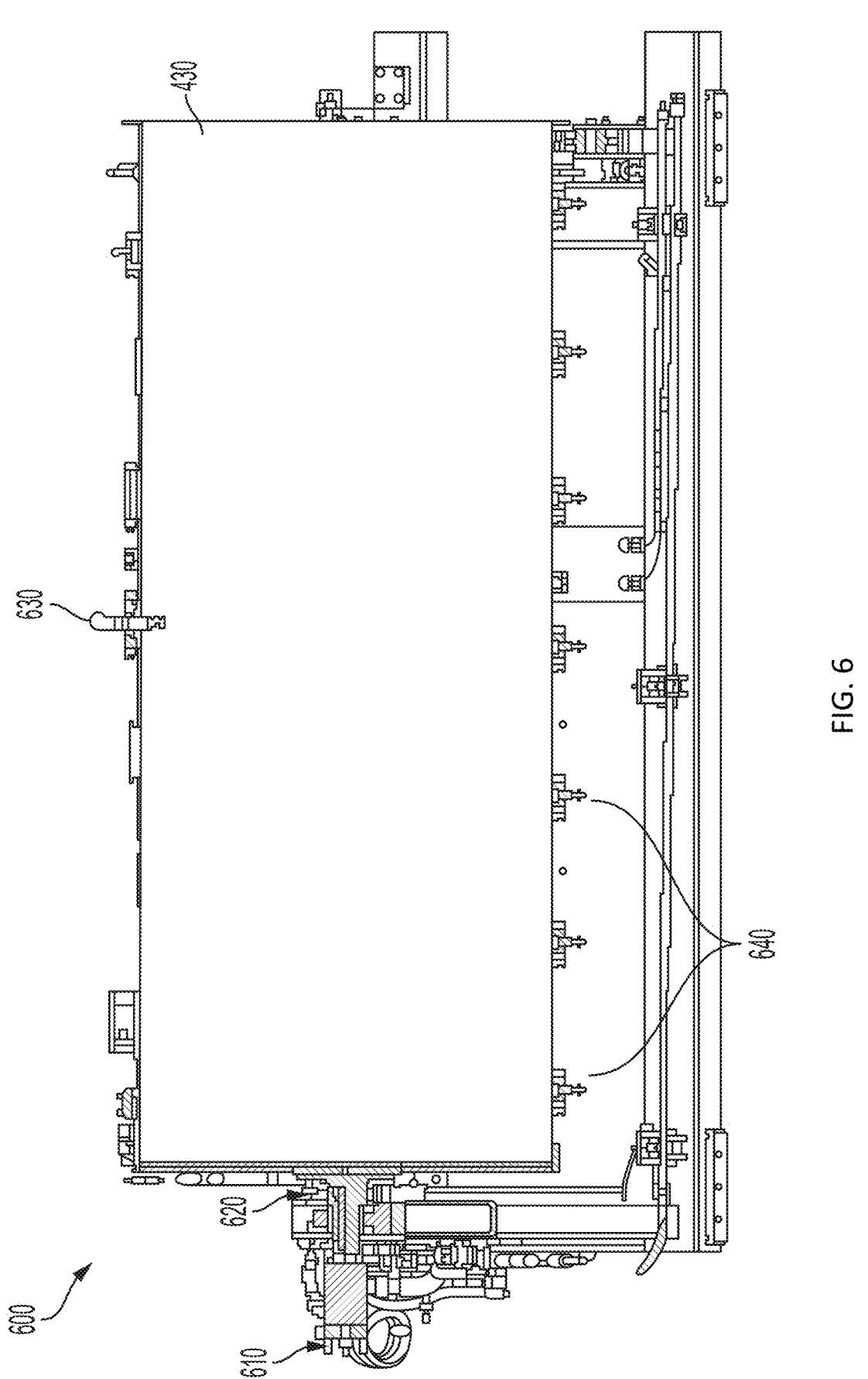

FIG. 6 is a diagram 600 depicting the plumbing components of the vessel 430. As shown, a rotary union 610 (e.g., the rotary union 520) is coupled to a rear axle manifold 620 (e.g., the rear axle manifold 510, which enables rotation of the vessel 430, the attachment or positioning of the main valve assembly 425, and/or passage of intake/exhaust tubes or conduits to the vessel 430. Intake valves 640 are disposed on a lower area of the vessel 430, and an exhaust component 630 is located on a top, centered, area or surface of the vessel 430.

Figure 7:
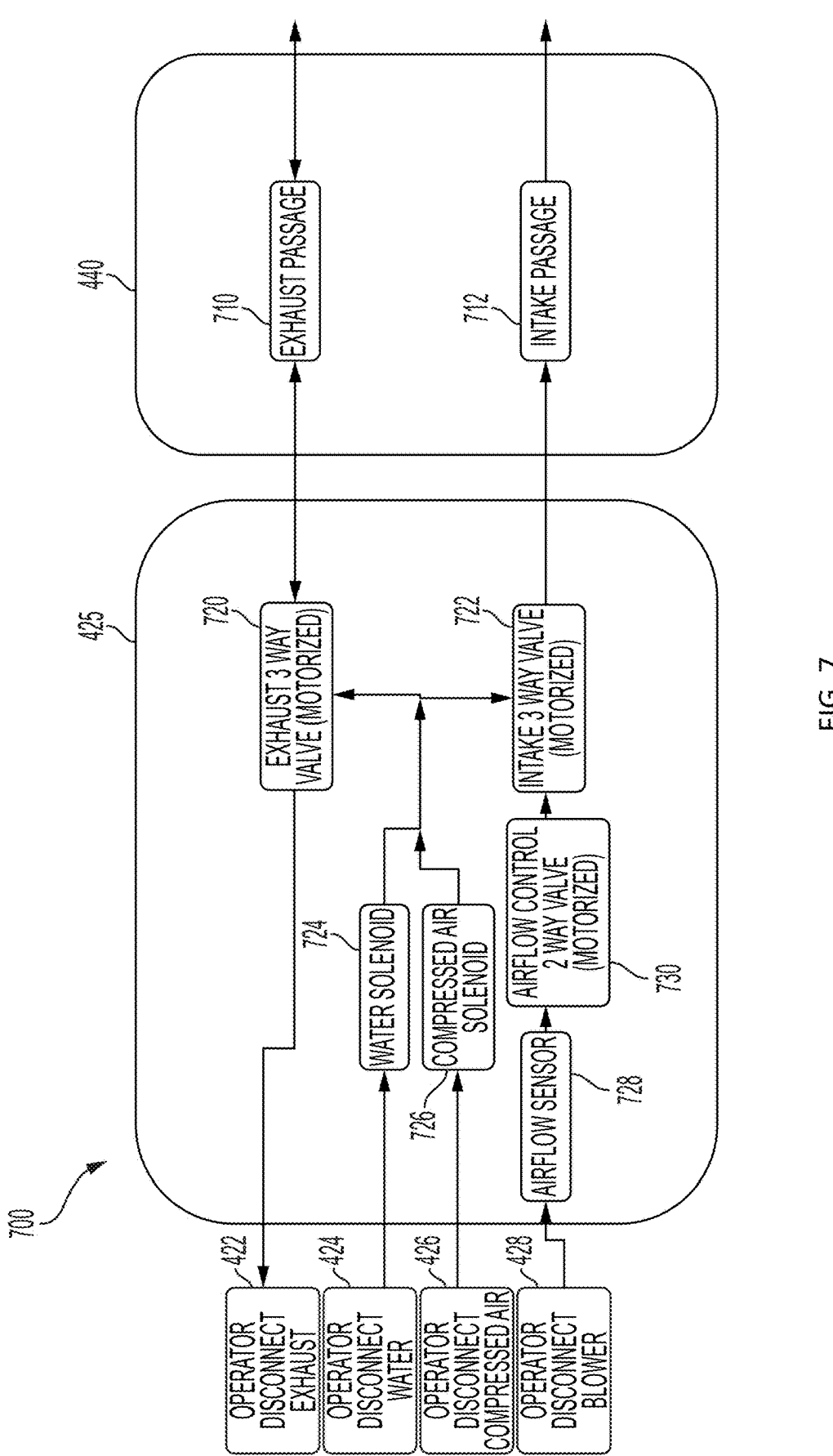
FIGS. 7-8 are diagrams illustrating components for a main valve assembly of a composter.

FIG. 7 is a diagram 700 that depicts components of the main valve assembly 425. The components of the assembly 425 can be routed via the rotary union and rear axle manifold 440, such as via an exhaust passage 710 or routing component and/or an intake passage 712 or routing component.

The main valve assembly 425 includes a motorized three-way exhaust valve 720 and a motorized three-way intake valve 722 coupled to the exhaust valve 720. The exhaust valve 720 and/or the intake valve 722 can receive water, via a water solenoid 724 and/or compressed air via an air solenoid 726. The intake valve 722 can also receive air via an airflow control valve 730 (e.g., a two-way motorized valve) and associated airflow sensor 728, which measures the air flow into the vessel 430.

Figure 8:
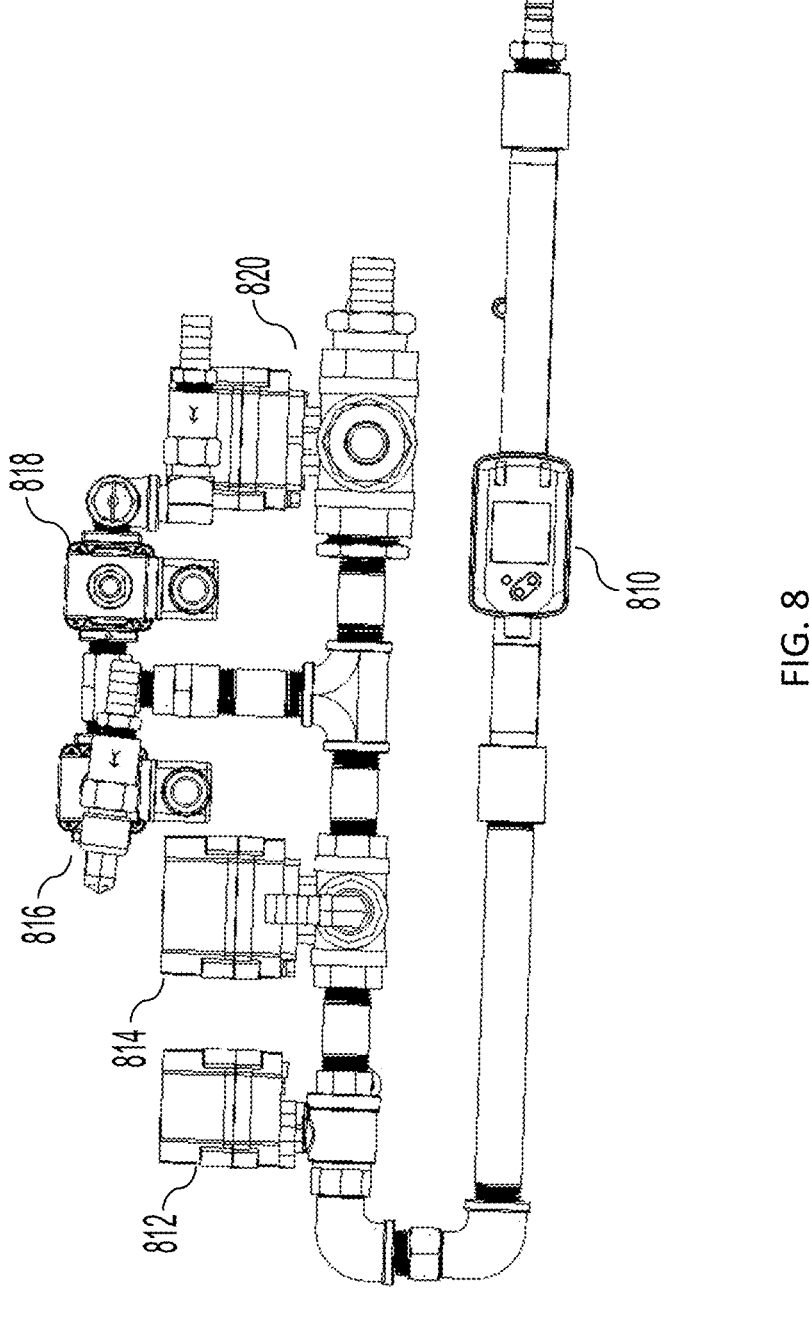

FIG. 8 is a diagram 800 depicting the components of the main valve assembly 425. The assembly 425 includes an airflow sensor 810 (e.g., the airflow sensor 728), an airflow control valve 812 (e.g., the airflow control valve 730), an intake valve 814 (e.g., the intake valve 722), an exhaust valve 820 (e.g., the exhaust valve 720), a water solenoid 816 (e.g., the water solenoid 724), and a compressed air solenoid 818 (e.g., the air solenoid 726).

Figure 9:
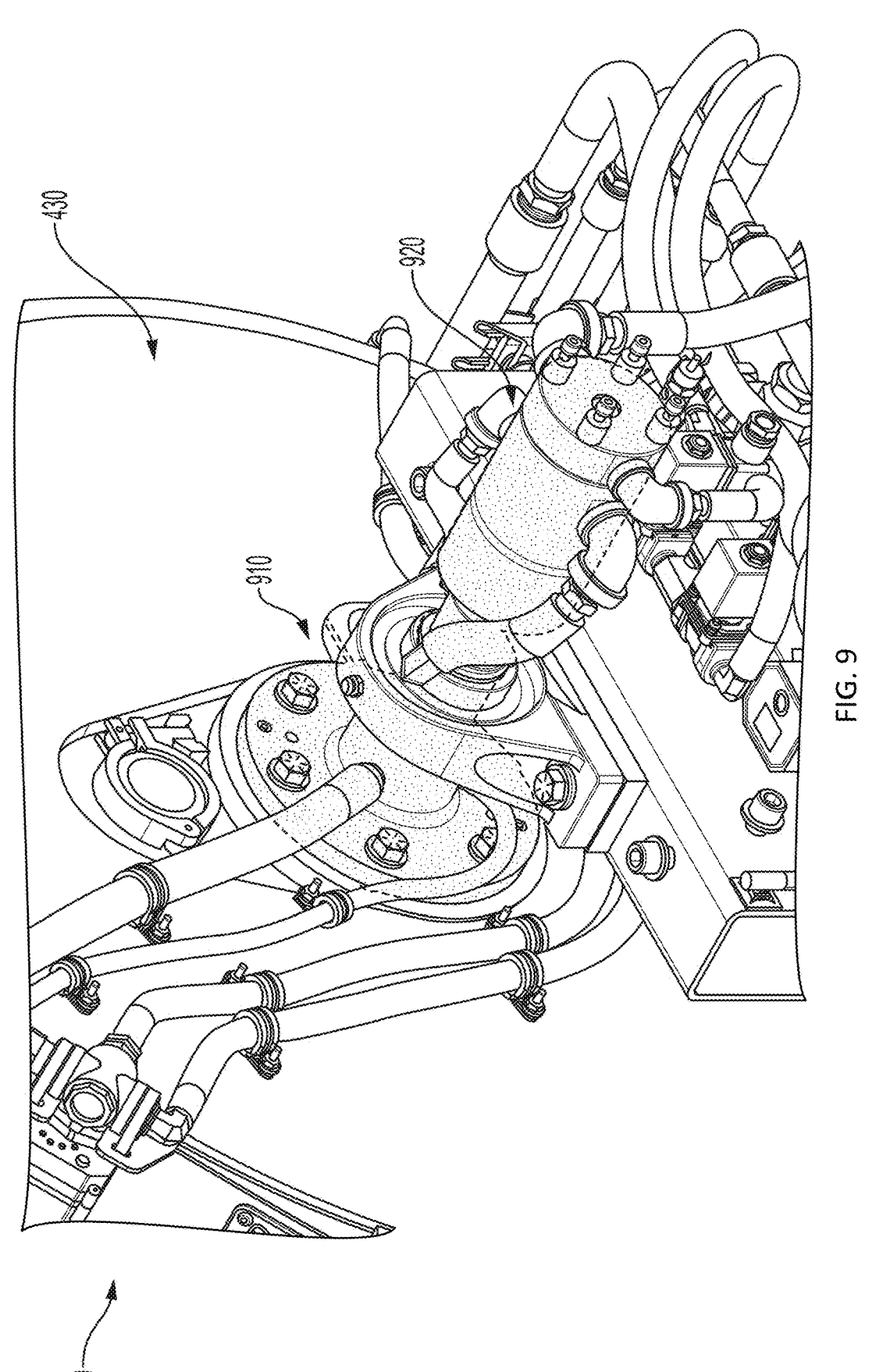
FIG. 9 is a diagram illustrating a rotary union and rear axle manifold for a composter.

FIG. 9 is a diagram 900 illustrating a rotary union 920 and rear axle manifold 910 for a composter, such as the composter 300. As described herein, these components facilitate the support and rotation of the vessel 110 or vessel 430, as well as routing various tubes or conduits from the main valve assembly 425 to the vessel 110 or 430.

Figure 10:
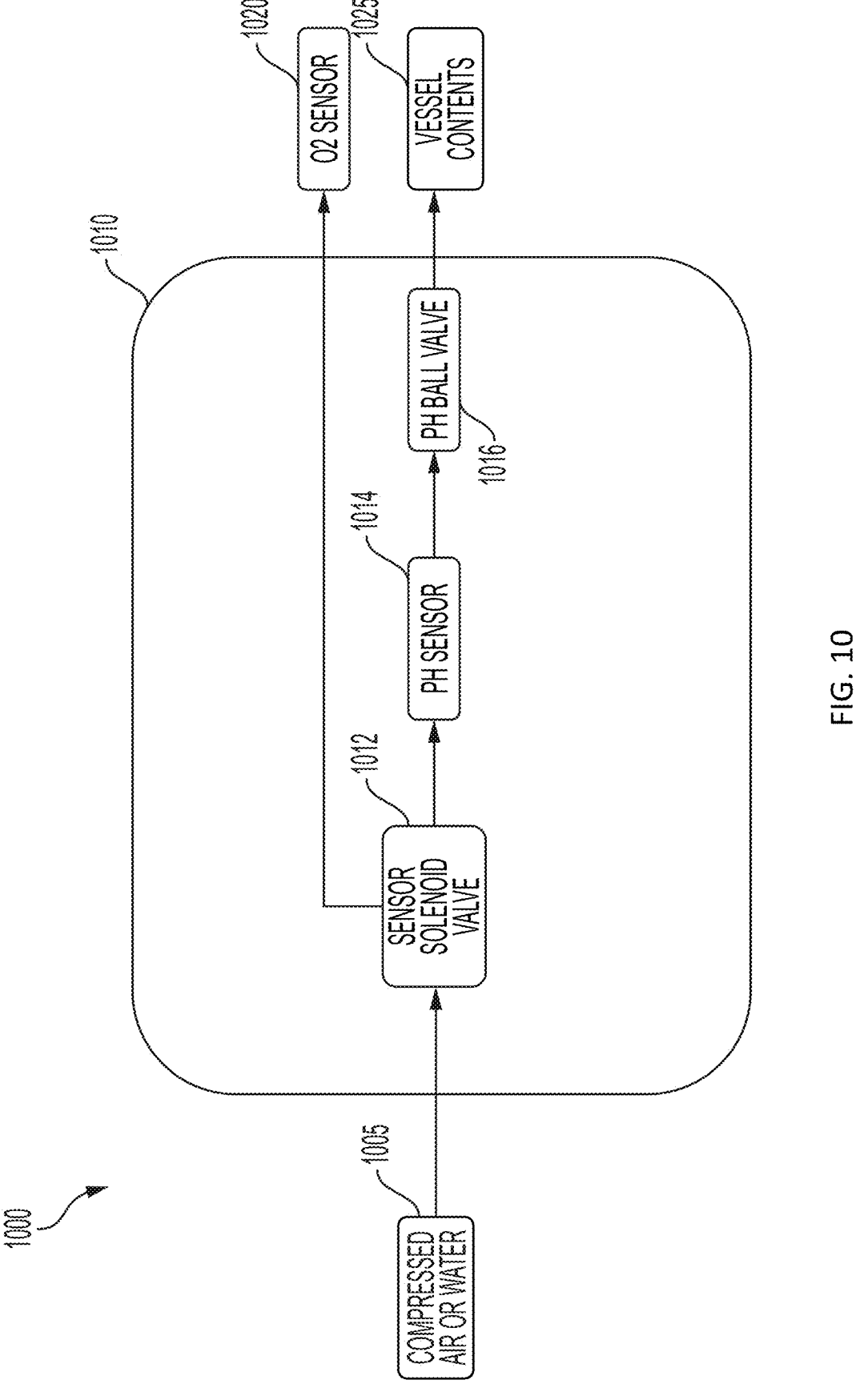
FIG. 10 is a diagram illustrating plumbing components of a pH sampler assembly for a composter.

As described herein, the vessel 430 can include or support various measurement or sampling components, such as components that measure characteristics or conditions within the vessel 430 during a composting process. FIG. 10 is a diagram 1000 illustrating plumbing components of a pH sampler assembly 1010 for a composter.

The assembly 1010 may receive compressed air or water 1005 via a sensor solenoid valve 1012, which routes the air/water to a pH sensor 1014 to detect pH levels in the water and/or air of the vessel 430. A ball valve 1016 can control output of the air/water into the vessel 430 (and onto or in vessel contents 1025). The sensor solenoid valve 1012 may also route the air or water to an oxygen (O2) sensor 1020, or other measurement or sampling components.

Figure 11:
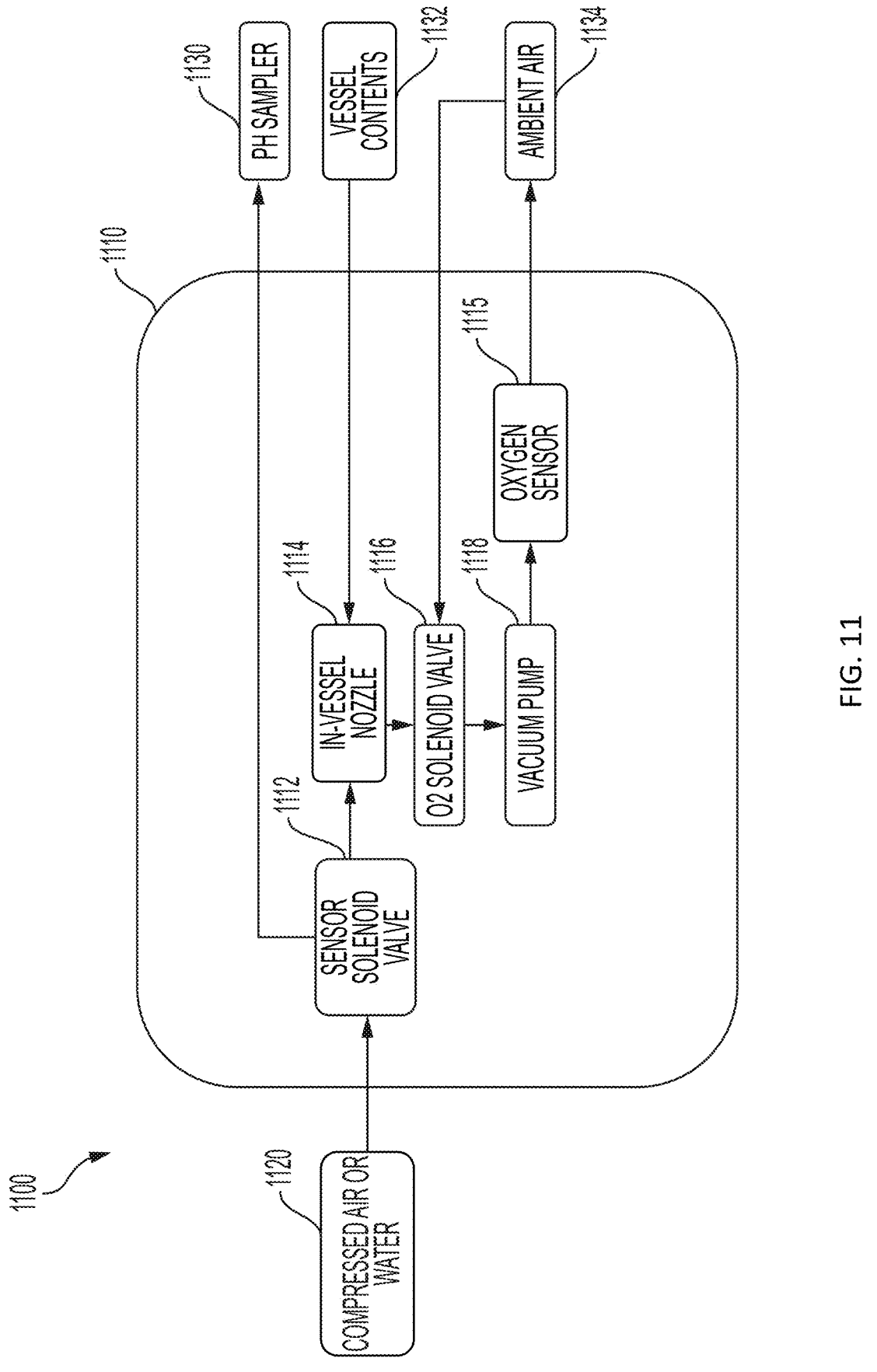
FIG. 11 is a diagram illustrating plumbing components of an oxygen sampler assembly for a composter.

FIG. 11 is a diagram 1100 illustrating plumbing components of an oxygen sampler assembly 1100 for a composter. The assembly 1110 may receive compressed air or water 1120 via a sensor solenoid valve 1112, which routes the air/water to an in-vessel nozzle 1114, which transfers the water/air to a solenoid valve 1116, vacuum pump 1118, and to an oxygen sensor 1115, which detects O2 levels in the water and/or air of the vessel 430.

The solenoid valve 1116 can receive ambient air 1134 from outside the vessel 430, and the nozzle 1114 may be coupled with contents 1132 of the vessel 1130. The sensor solenoid valve 1112 may also route the air or water to a pH sampler 1130, or other measurement or sampling components.

Figure 12A:
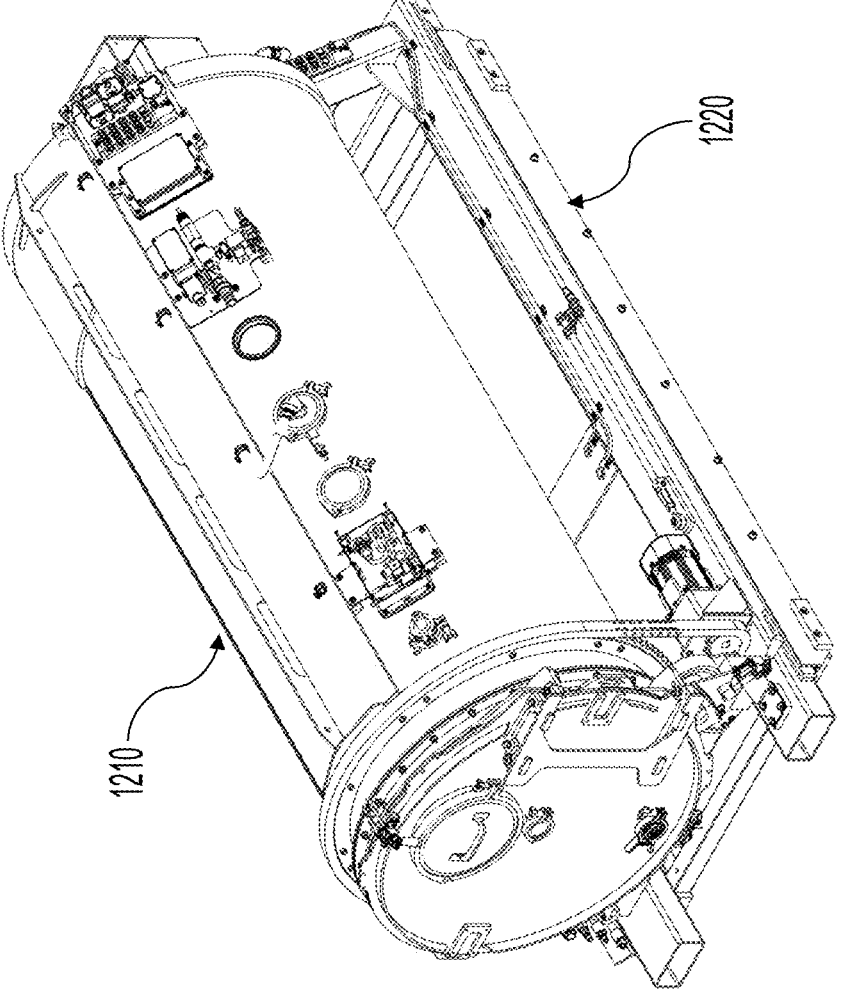
FIGS. 12A-13 are diagrams illustrating a composter hav-ing a platform of load cells.

As described herein, in some embodiments, a composter 110 may include or employ load cells or other sensors that measure a weight or weight distribution of the composter 110, a vessel, and so on. FIGS. 12A-13 are diagrams that depict a composter 1200 with one or more load cells.

Figure 12B:
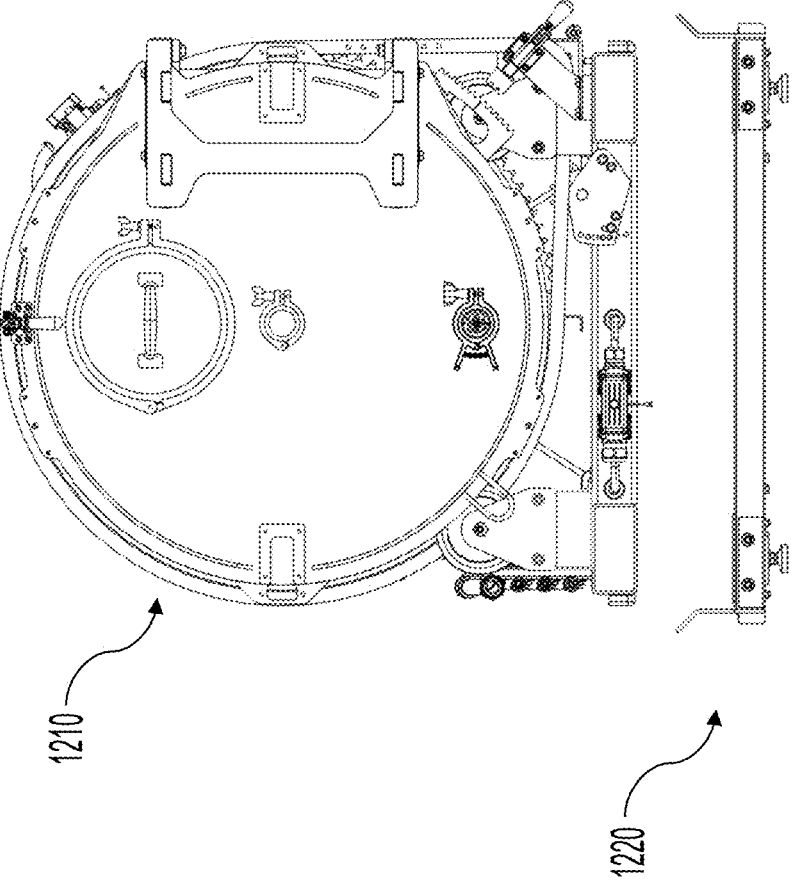
Figure 13:
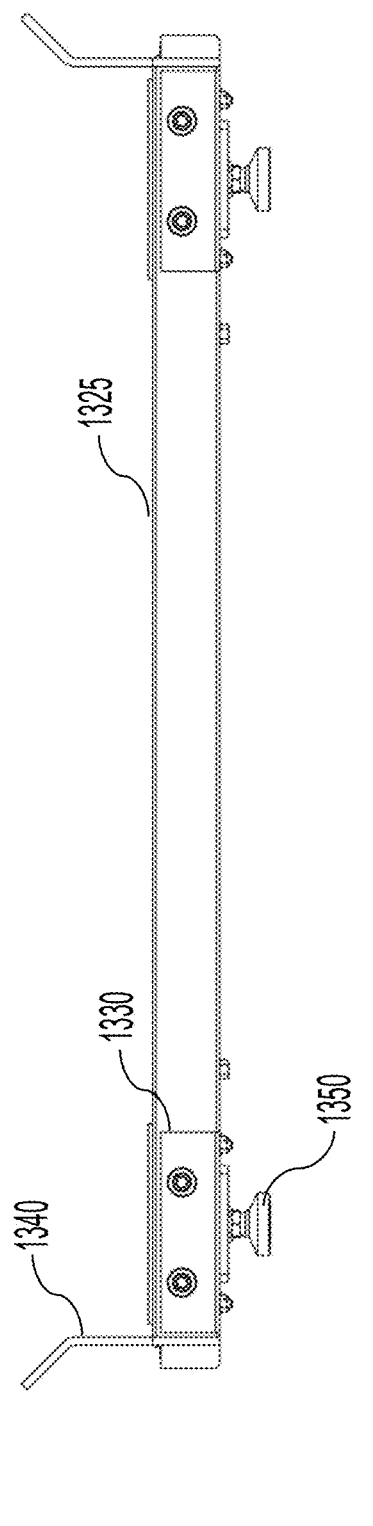

As shown in FIGS. 12A-12B, the composter 1200 includes a vessel 1210 and a platform 1220, upon which the vessel 1210 sits or is disposed. The platform 1220, as shown in FIG. 13, can include a frame 1325 that includes multiple load cells 1330, such as a load cell at each of the four corners of the frame 1325. Although depicted as a separate component (or part of a rack assembly), in some cases, the vessel 1210 may incorporate load cells and/or may integrate aspects of the platform 1220 into other components of the composter 1200.

The platform 1220 may also include guide rails 1340 disposed on each of the long sides of the frame 1325, to assist in placement and/or removal of the vessel 1210 onto or off from the platform 1220 (such as via a forklift, as described herein). Further, the platform 1220 can include feet 1350, which support the platform 1220 and/or provide a mechanism to level and/or distribute an overall weight applied to the platform 1220 by the vessel 1210 and its contents.

Thus, the platform 1220 may act as a "scale" for the vessel 1210, tracking the weight, and distribution of weight, for the vessel 1210 during running composting operations. As described herein, the tracked weight can indicate or provide feedback on various conditions of an ongoing composting operation, such as water loss through evaporation, speed of decomposition of the contents of the vessel 1210, predicted end timing of the operation (e.g., a lowered weight (or mass) indicates CO2 has left the contents), the state of the composition of the contents, abnormalities in the composting operation, and other conditions described herein.

For example, using the load cells, the composting system 120 may map or track a two-dimensional weight distribution of the vessel 1210 during running operations, such as during different stages of running NOR operations. The use of load cells to track the weight of the vessel during the running composting operation can inform or otherwise provide feedback for many different processes (e.g., what is the water content within the enclosed vessel), resulting in an enhanced or optimized composting operation, among other benefits.

Thus, in various embodiments, a composter can include components configured to perform composting processes or NOR using a rotating or oscillating vessel (e.g., a drum composter), while controlling and monitoring the intake and exhaust of air or water into or out of the vessel, among other benefits.

Examples of Processes Associated with the Composting System

As described herein, the composting system 120 (or one or more composters 110) may monitor the performance of composting processes within the composters, control operations of the composters, measure data or information associated with running composting (e.g., NOR) processes, generate reports associated with running or finished processes, and so on. The composting system 120 and/or composters may perform such processes in an enclosed environment, such as within a sealed or enclosed composter during an overall composting operation.

Figure 14:
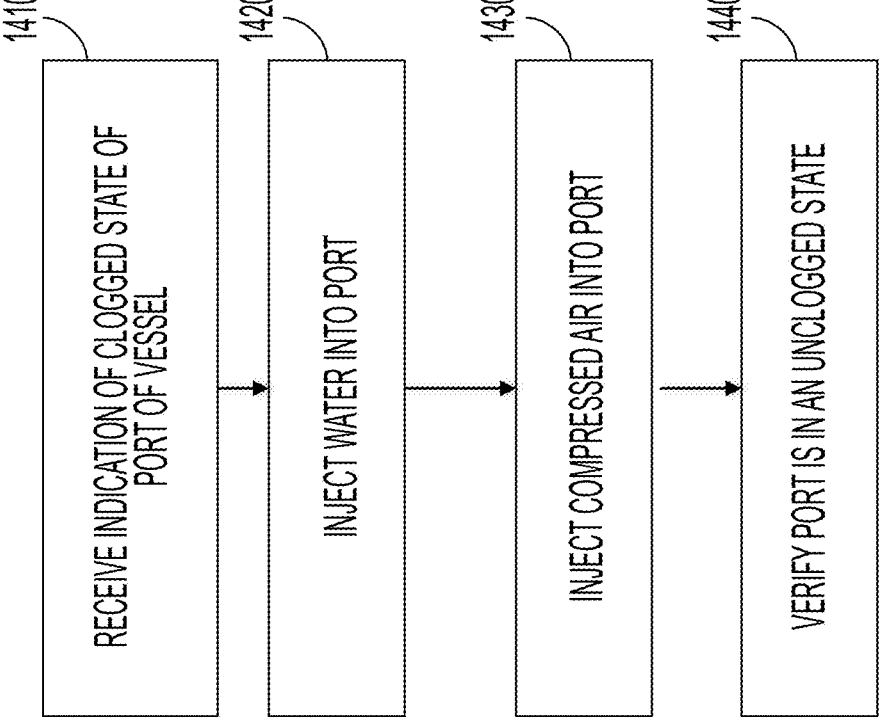
FIG. 14 is a flow diagram illustrating a method for backwashing a composter.
Figure 14:
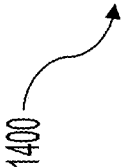

In some embodiments, the composting system 120 and/or a composter 110 may enable a backwash process, which is performed to clean one or more ports or valves of the composter 110. FIG. 14 is a flow diagram illustrating a method 1400 for backwashing a composter. The method 1400 may be implemented, at least in part, by the composting system 120 and/or various components or devices associated with the composter 110.

In operation 1410, the system 120 receives an indication of a clogged port of a composter or vessel. For example, the system 120 may receive an indication that is based on a measured condition within the composter 110 during a running composting operation. The clogged port may be a valve, such as an intake valve, an output or exhaust valve, and so on. The indication may be based on a set frequency of events (e.g., every half hour, or a changing frequency aligned with an ongoing composting process) and/or may be based on the measured or predicted conditions within a vessel.

In some cases, the condition may be a pressure level detected within the composter 110 by a pressure transducer. The transducer can monitor, track, or measure an ongoing pressure inside the composter 110, and when the pressure changes (e.g., increases), determine the increase in pressure is due to a clog in or at an exhaust value. Thus, when the pressure changes in an abnormal manner, the system 120 can receive an indication of a clog in an exhaust valve.

In some cases, the condition may be a level of oxygen, or 02, within the composter 110. For, example, an oxygen sensor can monitor, track, or measure an ongoing oxygen concentration inside the composter 110, and when there is a change (e.g., a decrease) in the oxygen concentration, determine there is a clog in an intake valve of the composter 110.

In some cases, the system 120 may also receive the indication when a clog is predicted to occur, based on some or all of the measured conditions described herein. For example, the system 120 may utilize sensor information, historical operation information, and so on, to identify a potential clog and automatically send an indication to perform a backwash process at a certain future time.

Thus, the system 120 may implement an auto-detection algorithm or process that continuously monitors conditions within the composter 110 and updates or changes a time to initial backwashing based on the monitored conditions.

In operation 1420, the system 120 injects water into the port. For example, the system 120 may cause an intake component of the composter 110 to shoot or supply water into the clogged port, initiating the backwashing process of unclogging the port (e.g., clearing out material in the port).

In operation 1430, the system 120 injects compressed air into the port. For example, the system 120 may cause the intake component of the composter 110 to shoot or supply compressed air into the port after the water is shot into the port, continuing the backwashing process of unclogging the port.

As described herein, the composter 110 can include certain valve configurations or structures that facilitate implementation of the backwash process during an ongoing (and enclosed) composting operation. For example, the intake valve may be a three-way valve configured to intake air into the composter 110 during the composting operation, inject water into the valve during a backwash process, and inject compressed air into the valve during the backwash process.

In some cases, the system 120 may utilize additional washing steps or processes when cleaning or clearing a port. For example, the composter 110 can include a water jet machine that injects an abrasive (e.g., a fine silica particulate) during the backwash process. Further, the system 120 may initiate multiple air injection or water injection operations, based on the severity of the clog, the timing of the process, and so on.

The system 120, in some cases, may also initiate a water or air injection to determine if there is a clog in a port such as an intake valve. The system 120 can proactively inject air/water, measure any pressure changes, and if the pressure does not change (or there is no increase in air flow), determine the port is sufficiently or positively clogged.

In operation 1440, the system 120 verifies the port is in an unclogged state. For example, the system 120 may take one or more measurements associated with conditions within the composter 110, and determine, based on the measurements, whether the clog has been cleared, or whether to initiate an additional backwash step or process.

As described herein, in various embodiments, the system 120 operates to oscillate the composter 110, such as the vessel 310, continuously during a composting operation, positioning or moving the pile of compost into different areas at different times and/or for different processes during the composting operation. As an example, the system 120 may cause the vessel 310 to rotate 45 degrees clockwise for a few minutes, and then rotate 105 degrees counterclockwise for a subsequent minute and repeat the pattern. Such oscillation, as described herein, enables or facilitates a continuous movement or mixing of the pile of compost during a composting (e.g., NOR) operation, among other benefits.

The system 120 may utilize an oscillation of the vessel 310 to avoid full rotation of the vessel 310 during a composting operation. In some cases, a full rotation may cause a pile of compost to contact or otherwise interact with certain components (e.g., exhaust valves), which may be undesirable during a running composting operation. Thus, the system 120 may facilitate a precise control of the rotation of vessel 120 to maintain an exhaust value (or other components) in a certain orientation (e.g., relatively above) during the composting operation.

Figure 15:
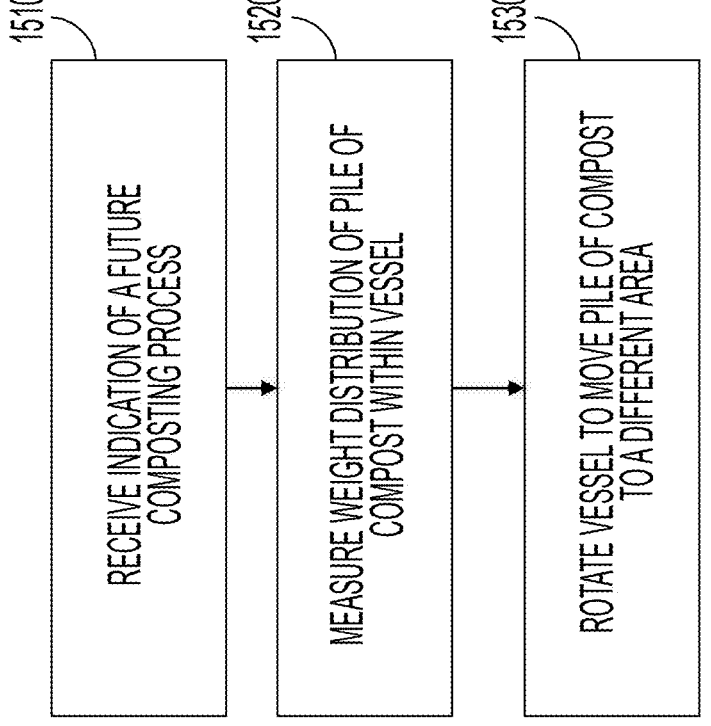
FIG. 15 a flow diagram illustrating a method for control-ling a vessel of a composter.

In some cases, the system 120 may utilize information about a weight of the pile of compost within the vessel 310 to determine the location/area of the pile and control the rotation of the vessel 310 accordingly. FIG. 15 a flow diagram illustrating a method 1500 for controlling a vessel of a composter. The method 1500 may be implemented, at least in part, by the composting system 120 and/or various components or devices associated with the composter 110.

In operation 1510, the system 120 receives an indication of a future, or upcoming, composting process. For example, during a running or ongoing composting operation, a next process may be to add an amendment to the pile of compost, aerate the pile of compost, perform a backwashing process, and so on. The system 120 may receive or access information identifying a timing of the different processes, or an indication of a dynamically initiated process (e.g., a determination of a predicted clog in a valve of the composter 110).

In operation 1520, the system 120 measures a weight distribution for the pile of compost within the vessel. For example, the system 120 may utilize information from one or more load cells (e.g., the load cells 1420) to identify a location or area of the pile of compost within the vessel.

The system 120 may utilize information about the weight of the vessel 310, the weight of the pile of compost and so on, when determining an area or location of the pile of compost. In some cases, the area may include or be proximate to one or more components of the vessel 310, such as an intake valve, an exhaust valve, and so on. The system 120, therefore, may determine a pile of compost is level or proximate to a component based on the measured weight distribution.

In some cases, the system 120 may utilize other information from sensors when determining the location of the pile of compost. For example, the system 120 may utilize information from proximity sensors, image sensors, pressure sensors, and so on.

In operation 1530, the system 120 rotates the vessel to move the pile of compost to a different area. For example, the system 120 may cause the vessel 310 to rotate in a clockwise direction to level the pile of compost and/or to move the pile of compost over or proximate to various internal components. The system 120 may monitor or measure the angle or rotation using inclinometers (or other inertial sensors, such as IMUs, conductive flag, and so on.

Therefore, the system 120 may perform the method 1500 for a variety of reasons or operational factors, including:

identifying a certain area within the cylindrical vessel contains the organic pile and rotating the cylindrical vessel to transfer the organic pile to another area within the cylindrical vessel;

determining the organic pile is not level and rotating the cylindrical vessel to flatten the organic pile;

determining the organic pile is proximate to an intake valve located at a lower area of the cylindrical vessel and rotating the cylindrical vessel to transfer the organic pile away from the intake valve at the lower area of the cylindrical vessel; and so on.

Thus, the system 120 may utilize a motorized rotation to control movement or oscillation of the composter to perform various processes during a composting operation, such as the mixing of the pile of compost, the aeration of the pile of compost, and so on.

In some embodiments, the composting system 120 and/or a composter 110 may enable an aeration process, which is performed to facilitate an effective and/or efficient composting operation. The aeration process may include rotating the composter 110, such as the vessel 310, in both clockwise and counterclockwise directions, to direct or maintain an internal pile of compost at a certain position, angle, or location within the vessel 310.

Figure 16:
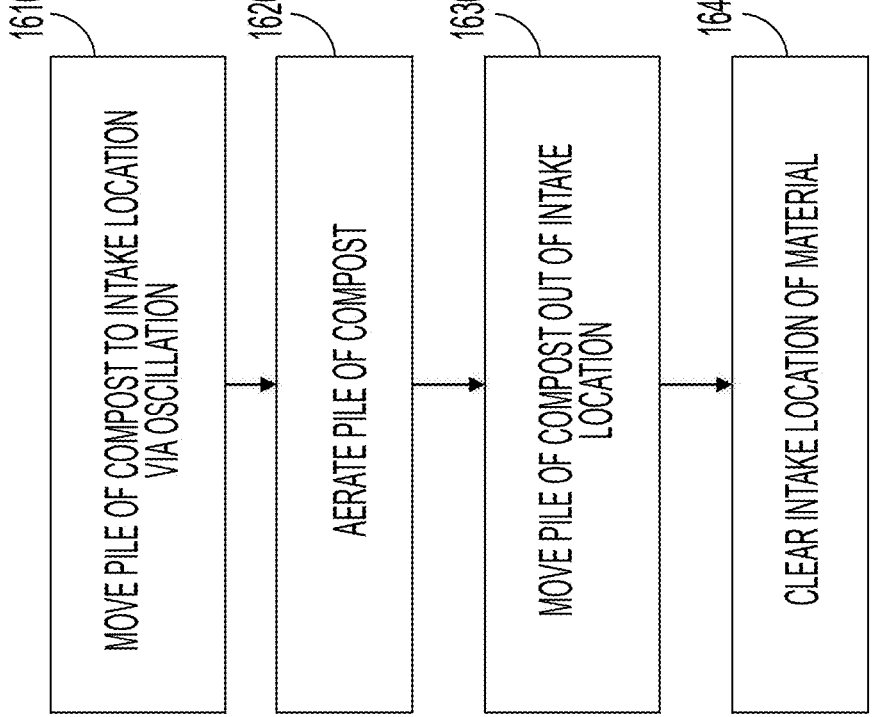
FIG. 16 is a flow diagram illustrating a method for aerating a pile of compost in a composter.

FIG. 16 is a flow diagram illustrating a method 1600 for aerating a pile of compost in a composter. The method 1600 may be implemented, at least in part, by the composting system 120 and/or various components or devices associated with the composter 110.

In operation 1610, the system 120 causes a pile of compost to move to an intake location via oscillation or other partial rotation of a composter. For example, the system 120, via the precise control of the vessel 310, may cause the pile of compost to move over an intake valve, such as a valve in the body of the vessel 310.

In operation 1620, the system 120 aerates the pile of compost. For example, the system 120 may include one or multiple aeration phases, such as a first phase of low air flow (e.g., 50 L/m for a week), a second phase of high air flow (e.g., 90 L/m for a day), and so on. The flow rates, in some cases, may be based on feedback data associated with conditions within the vessel 130, including temperature conditions, humidity conditions, pressure conditions, oxygen levels, and so on.

The system 120 may aerate the pile of compost in number of ways. For example, the system 120 can cause the injection of air from the intake valve into the pile of compost via a positive pressure system. As another example, the system 120 can pull air from a headspace within the vessel 310 into the pile of compost via a negative pressure system.

In operation 1630, the system 120 moves the pile of compost out of the intake location. For example, the system 120, via the precise control of the vessel 310, may cause the pile of compost to move away from the intake valve to a location associated with pausing the aeration or to a location during which the system 120 performs other processes during a composting operation.

For example, the system 120, in operation 1640, may optionally clear the intake location of material or debris, such as clogs within an intake valve. Thus, once the pile is moved out of the intake location, the system 120 can perform some or all aspects of the backwashing process described herein.

Thus, in various embodiments, the system 120 facilitates the aeration of a pile of compost within an enclosed system, such as a composter that maintains an enclosed environment during a running composting operation (e.g., which can run from 7-45 days, or longer). The system 120, using the techniques described herein, can aerate material while controlling fumes and maintain clear and useful lines (e.g., intake or exhaust valves) into and out of the enclosed vessel, among other benefits.

Further, in some embodiments, the systems and methods described herein can enable a NOR operation that includes some or all of the following processes—the control of airflow and aeration within a NOR vessel along with exhausting of air flow, while monitoring and controlling the pressure and temperature within the vessel. As described herein, the NOR vessel enables such control/monitoring via the various ports mounted to or within the vessel (e.g., to a body of the vessel, a rear or back of the vessel, a front hatch of the vessel, and so on), facilitating a direct or indirect aeration and exhaust of an internal compost pile.

Example Embodiments of the Technology

As described herein, the technology may enhance or improve upon NOR operations, such as composters utilized during NOR operations and/or how certain NOR processes (and an overall NOR operation) may be improved, enhanced, or modified based on monitoring and/or control of one or more composters.

In some embodiments, a composter comprises a cylindrical vessel and a frame that supports the cylindrical vessel, wherein the frame includes multiple trunnions upon which a front end of the cylindrical vessel is supported, and a rear axle that connects a rear end of the cylindrical vessel to the frame.

In some cases, the composter includes a gear that is fixed to an outer surface of the cylindrical vessel at the front end of the cylindrical vessel, a motor that drives rotation of the cylindrical vessel, and a chain that couples the motor to the gear.

In some cases, the multiple trunions are disposed at a front end of the frame and a center area of the frame.

In some cases, the composter includes multiple fork pockets within the frame, wherein the multiple fork pockets are configured to receive tines of a forklift when the composter is moved from one location to another location.

In some cases, the composter includes a protective fin disposed on a top section of a top surface of the cylindrical vessel.

In some cases, the composter includes a front hatch disposed at a front end of the cylindrical vessel, wherein the front hatch is configured to be closed and sealed during a running composting operation within an inner area of the cylindrical vessel.

In some cases, the composter includes an amendment hatch disposed within the front hatch, wherein the amendment hatch is configured to facilitate addition of amendment material during the running operation.

In some cases, the amendment hatch includes an airlock mechanism.

In some cases, the composter includes a main valve assembly disposed at a rear area of the cylindrical vessel and a rear assembly connected to the rear area of the cylindrical vessel and configured to facilitate rotation of the cylindrical vessel on the frame and couple the main valve assembly to the cylindrical vessel.

In some cases, the rear assembly includes a rotary union that is configured to rotate the cylindrical vessel on the frame, and a real axle manifold that routes multiple tubes of the main valve assembly to the cylindrical assembly.

In some cases, the main valve assembly includes a motorized three-way exhaust valve; and a motorized three-way intake valve coupled to the exhaust valve.

In some embodiments, a vessel for natural organic reduction (NOR) operations includes a cylindrical body, an exhaust valve located at top area of the cylindrical body, and multiple intake valves located at a lower area of the cylindrical body.

In some cases, each intake valve of the multiple intake valves is disposed along a long axis of the cylindrical body.

In some cases, the vessel includes a front hatch disposed at a front end of the cylindrical body, wherein the front hatch is configured to be closed and sealed during NOR operations within an inner area of the cylindrical body.

In some cases, the vessel includes an amendment hatch disposed within the front hatch, wherein the amendment hatch is configured to facilitate addition of amendment material during the NOR operations.

In some cases, the vessel includes a pH level sampling component disposed proximate to the exhaust valve and an oxygen level sampling component disposed proximate to the exhaust valve.

In some embodiments, a composter comprises a cylindrical vessel and a platform that supports the cylindrical vessel, wherein the platform includes one or more load cells that measure a weight distribution of the cylindrical vessel.

In some cases, the one or more load cells are configured to measure the weight distribution of the cylindrical vessel when the cylindrical vessel oscillates during a composting operation.

In some cases, the platform has a rectangular shape, and wherein a load cell is disposed at each corner of the platform.

In some cases, the composter includes guide rails disposed on the platform and configured to secure a placement of the cylindrical vessel on the platform.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the NOR vessel and various NOR processes or operations may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

16

What is claimed is:

1. A composter, comprising:
a cylindrical vessel;
a frame that supports the cylindrical vessel, wherein the frame includes:
multiple trunnions upon which a front end of the cylindrical vessel is supported; and
a rear axle that connects a rear end of the cylindrical vessel to the frames multiple fork pockets within the frame,
wherein the multiple fork pockets are configured to receive tines of a forklift when the composter is moved from one location to another location; and
a protective fin disposed on a top section of a top surface of the cylindrical vessel.

2. The composter of claim 1, further comprising:
a gear that is fixed to an outer surface of the cylindrical vessel at the front end of the cylindrical vessel; and
a motor that drives rotation of the cylindrical vessel.

3. The composter of claim 1, wherein the multiple trunnions are disposed at a front end of the frame.

4. The composter of claim 1, further comprising:
a front hatch disposed at the front end of the cylindrical vessel,
wherein the front hatch is configured to be closed and sealed during a running composting operation within an inner area of the cylindrical vessel.

5. The composter of claim 4, further comprising:
an amendment hatch disposed within the front hatch,
wherein the amendment hatch is configured to facilitate addition of amendment material during the running composting operation.

6. The composter of claim 5, wherein the amendment hatch includes an airlock mechanism.

7. The composter of claim 1, further comprising:
a main valve assembly disposed at the rear end of the cylindrical vessel; and
a rear assembly connected to the rear end of the cylindrical vessel and configured to facilitate rotation of the cylindrical vessel on the frame and couple the main valve assembly to the cylindrical vessel.

8. The composter of claim 7, wherein the rear assembly includes:
a rotary union that is configured to rotate the cylindrical vessel on the frame; and
a rear axle manifold that routes multiple tubes of the main valve assembly to the cylindrical vessel.

9. The composter of claim 7, wherein the main valve assembly includes:
a motorized three-way exhaust valve; and
a motorized three-way intake valve coupled to the exhaust valve.

10. A composter, comprising:
a cylindrical vessel;
a frame that supports the cylindrical vessel, wherein the frame includes:
multiple trunnions upon which a front end of the cylindrical vessel is supported; and
a rear axle that connects a rear end of the cylindrical vessel to the frame;
a front hatch disposed at the front end of the cylindrical vessel;
an amendment hatch disposed within the front hatch;
a main valve assembly disposed at the rear end of the cylindrical vessel; and a rear assembly connected to the rear end of the cylindrical vessel and configured to facilitate rotation of the cylindrical vessel on the frame and couple the main valve assembly to the cylindrical vessel; and a protective fin disposed on a top section of a top surface of the cylindrical vessel.

11. The composter of claim 10, wherein the front hatch is configured to be closed and sealed during a running composting operation within an inner area of the cylindrical vessel; and wherein the amendment hatch includes an airlock mechanism and is configured to facilitate addition of amendment material during the running composting operation.

12. The composter of claim 11, wherein the rear assembly includes:

a rotary union that is configured to rotate the cylindrical vessel on the frame; and a rear axle manifold that routes multiple tubes of the main valve assembly to the cylindrical vessel.

13. The composter of claim 11, wherein the main valve assembly includes:

a motorized three-way exhaust valve; and a motorized three-way intake valve coupled to the exhaust valve.

14. A composter, comprising:

a cylindrical vessel;

a frame that supports the cylindrical vessel, wherein the frame includes:

multiple trunnions upon which a front end of the cylindrical vessel is supported; and a rear axle that connects a rear end of the cylindrical vessel to the frame;

a main valve assembly disposed at the rear end of the cylindrical vessel, wherein the main valve assembly includes:

a motorized three-way exhaust valve; and a motorized three-way intake valve coupled to the exhaust valve; and a rear assembly connected to the rear end of the cylindrical vessel and configured to facilitate rotation of the cylindrical vessel on the frame and couple the main valve assembly to the cylindrical vessel, wherein the rear assembly includes:

a rotary union that is configured to rotate the cylindrical vessel on the frame; and a rear axle manifold that routes multiple tubes of the main valve assembly to the cylindrical vessel; and a protective fin disposed on a top section of a top surface of the cylindrical vessel.

* * * * *